United States Patent
Thompson et al.

(10) Patent No.: US 9,200,429 B2
(45) Date of Patent: Dec. 1, 2015

(54) WORK VEHICLE WITH LOADER CONTROLLED CAB TILTING

(71) Applicant: Deere & Company, Moline, IL (US)

(72) Inventors: Graham Thompson, Janesville, IA (US); Christian Von Holst, Hettenleidelheim (DE)

(73) Assignee: DEERE & COMPANY, Moline, IL (US)

(*) Notice: Subject to any disclaimer, the term of this patent is extended or adjusted under 35 U.S.C. 154(b) by 111 days.

(21) Appl. No.: 14/068,116

(22) Filed: Oct. 31, 2013

(65) Prior Publication Data

US 2015/0117998 A1    Apr. 30, 2015

(51) Int. Cl.
| | |
|---|---|
| E02F 9/16 | (2006.01) |
| E02F 3/28 | (2006.01) |
| E02F 9/20 | (2006.01) |
| B60G 17/005 | (2006.01) |
| E02F 9/02 | (2006.01) |
| B66F 9/075 | (2006.01) |
| B60G 99/00 | (2010.01) |

(52) U.S. Cl.
CPC .............. *E02F 9/166* (2013.01); *B60G 17/005* (2013.01); *B60G 99/008* (2013.01); *B66F 9/0759* (2013.01); *E02F 3/283* (2013.01); *E02F 9/024* (2013.01); *E02F 9/2025* (2013.01); *B60G 2300/08* (2013.01); *B60G 2300/09* (2013.01); *B60G 2400/204* (2013.01); *B60G 2400/95* (2013.01)

(58) Field of Classification Search
CPC ....... E02F 9/166; E02F 9/2025; E02F 9/2037; E02F 3/283; B62D 33/067

USPC ............... 180/89.15; 280/6.154; 296/190.05; 701/50

See application file for complete search history.

(56) References Cited

U.S. PATENT DOCUMENTS

| | | |
|---|---|---|
| 4,483,409 A | 11/1984 | Fun |
| 5,368,118 A | 11/1994 | Hoefle |
| 6,273,203 B1 | 8/2001 | Paggi et al. |
| 7,198,125 B2 | 4/2007 | Skelcher et al. |
| 7,396,070 B2 | 7/2008 | Albright |

(Continued)

FOREIGN PATENT DOCUMENTS

| | | | |
|---|---|---|---|
| CA | 2359160 A1 | * | 4/2002 |
| CN | 201472495 U | | 5/2010 |

(Continued)

OTHER PUBLICATIONS

European Search Report issued in counterpart application No. 14190088.6, dated Mar. 30, 2015 (9 pages).

*Primary Examiner* — Ruth Ilan

(57) ABSTRACT

A work vehicle includes a front axle, a rear axle, a chassis, a cab pivotally coupled to the chassis, a boom movably mounted on the chassis, and a boom cylinder for raising and lowering the boom. A rear suspension member raises and lowers the cab with respect to the rear axle. A front suspension member raises and lowers the chassis and the cab with respect to the front axle. An operator controlled command unit generates boom raise and lower signals. An electronic control unit (ECU) is connected to the front suspension member, the rear suspension member and the command unit. If vehicle speed is below a threshold speed, the ECU automatically operates the front and/or the rear suspension members to raise and lower the cab to improve visibility of the loader from the cab in response to the command unit operating the boom.

7 Claims, 2 Drawing Sheets

(56) References Cited

U.S. PATENT DOCUMENTS

2005/0264038 A1    12/2005   Albright
2009/0297275 A1    12/2009   Davis

FOREIGN PATENT DOCUMENTS

| | | |
|---|---|---|
| CN | 201901891 U | 7/2011 |
| CN | 102852180 A | 1/2013 |
| EP | 0247122 A1 | 12/1987 |
| GB | 2358839 A | 8/2001 |
| JP | 7156657 A | 6/1995 |
| JP | 2002030698 A | 1/2002 |
| JP | 2003171085 A | 6/2003 |
| JP | 2009269692 A | 11/2009 |
| JP | 2013166482 A | 8/2013 |

\* cited by examiner

WORK VEHICLE WITH LOADER CONTROLLED CAB TILTING

FIELD OF THE INVENTION

The present disclosure relates to a cab tilting system for a work vehicle with a loader.

BACKGROUND OF THE INVENTION

Certain current production tractors include a cab suspension which provides a manually activated service mode to lower or lift the suspension elements by 50 millimeter each direction. But, this operation is independent of loader operation.

Also, on current production tractors, the cab height is limited by several factors, which leads to a roof line, which finally limits the visible area of the tractor operator. Taller operators, which are sitting higher, sometimes have problems with the available visible area, especially when operating a loader. So-called "panorama windows" have been provided in an effort to enlarge visibility from the cab. However, tractor operators still desire better visibility, and there are factors which limit the size of such a window. It is desired to improve visibility from the cab during operation of a loader.

SUMMARY

According to an aspect of the present disclosure, a work vehicle includes a front axle, a rear axle, a chassis, a cab pivotally coupled to the chassis and a boom movably mounted on the chassis. A boom cylinder raises and lowers the boom. A rear suspension member raises and lowers the cab with respect to the rear axle. A front suspension member raises and lowers the chassis and the cab with respect to the front axle. An operator controlled command unit is manipulated by an operator to generate boom command signals. An electronic control unit (ECU) is connected to the front suspension member, the rear suspension member and the command unit. The ECU automatically operates the front suspension member to raise and lower the cab to improve visibility of the loader from the cab in response to the command unit operating the boom.

DETAILED DESCRIPTION OF THE DRAWINGS

Figure 1:
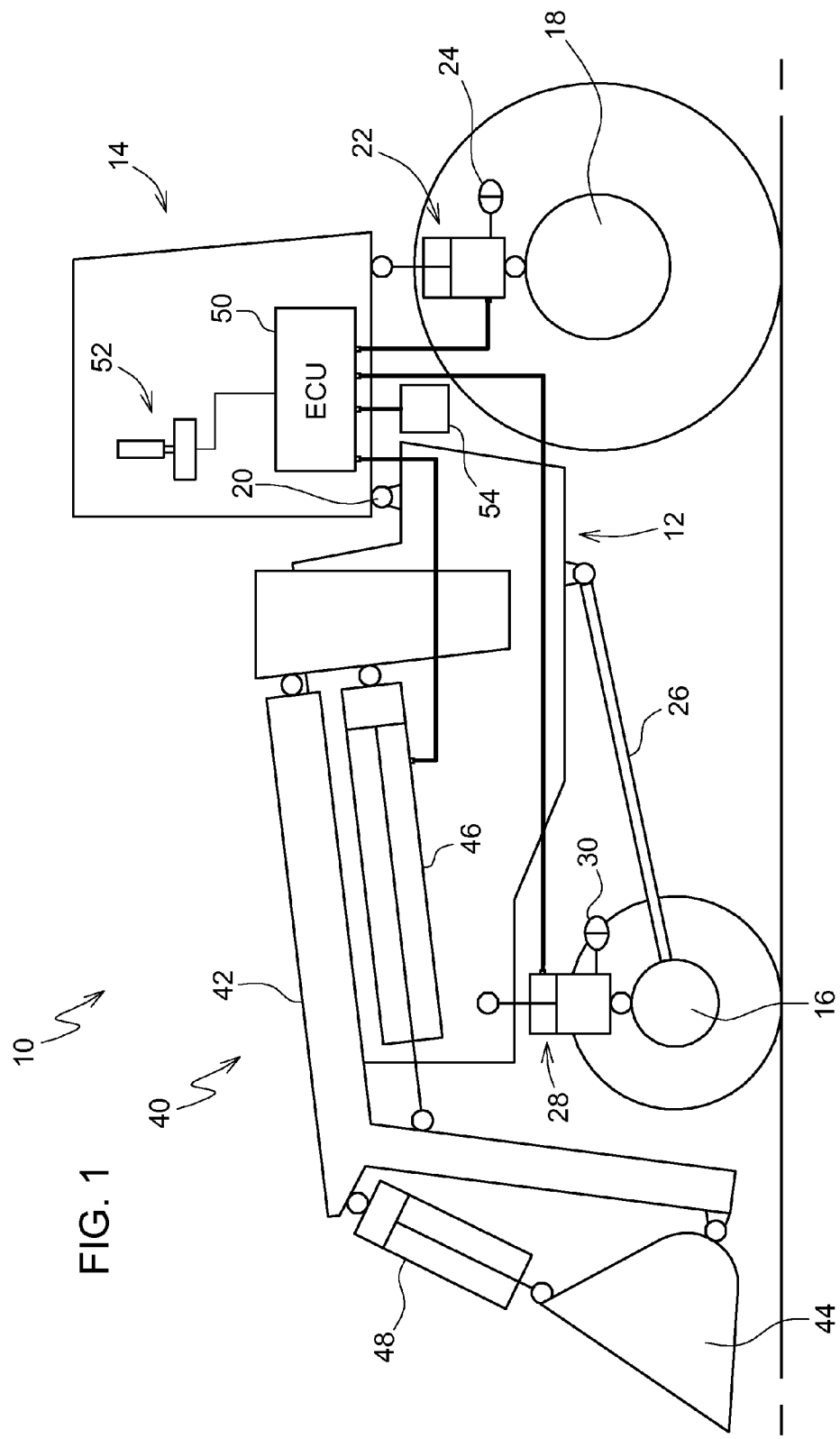
FIG. 1 is a schematic diagram of a vehicle which has a loader and a cab tilt system embodying the invention.

Referring to FIG. 1, a work vehicle 10, such as an agricultural tractor, includes a chassis 12 and a cab 14 supported on a front axle 16 and a rear axle 18. The cab 14 is pivotally supported on the chassis 12 at pivot 20. The cab 14 is also movably supported on rear axle 18 by a rear suspension member or cylinder 22. The cylinder 22 communicates with an accumulator 24. The chassis 12 is coupled to the front axle 16 by suspension 26 and by a front suspension member or cylinder 28. The cylinder 28 communicates with an accumulator 30.

A loader 40 is pivotally mounted to the work vehicle 10. The loader 40 includes a boom 42, a bucket 44 pivotally mounted to the boom 42, a boom cylinder 46 and a bucket cylinder 48.

The cylinders 22, 28, 46 and 48 are controlled by conventional electrohydraulic valves (not shown) which are controlled by electronic control unit (ECU) 50. A joystick 52 is used by an operator to control the raising and lowering of the loader 40 and operation of the bucket 44 in a known manner. A speed sensor 54 provides a vehicle speed signal to the ECU 50.

To enhance the visibility of the loader 40 from the cab 14, when the joystick 52 is manipulated to raise the loader, the ECU 50 automatically raises the chassis 12 and cab 14 by extending the front axle suspension cylinder 28. In addition, the cab suspension cylinder 22 may be retracted to it's most compressed length to lower the rear side of the cab 14 relative to a neutral position. Lowering of the cab 14 and raising of the chassis 12 may be independent or combined.

To enhance the visibility of the loader 40 when the joystick 52 is manipulated to lower the loader, the ECU automatically lowers the chassis 12 and cab 14 by compressing the front axle suspension cylinder 28 to its minimum length and/or by extending the cab suspension cylinder 22 to its maximum length. These operations can be performed independently or combined, depending on the tractor configuration (such as if the vehicle includes only a cab suspension member, only a front axle suspension member, or with both front and rear suspension members). This system could be used with any cab suspension which facilitates leveling and is able to be controlled by an external signal, such as generated manually by operator or automatically by an electronic control unit.

Figure 2:
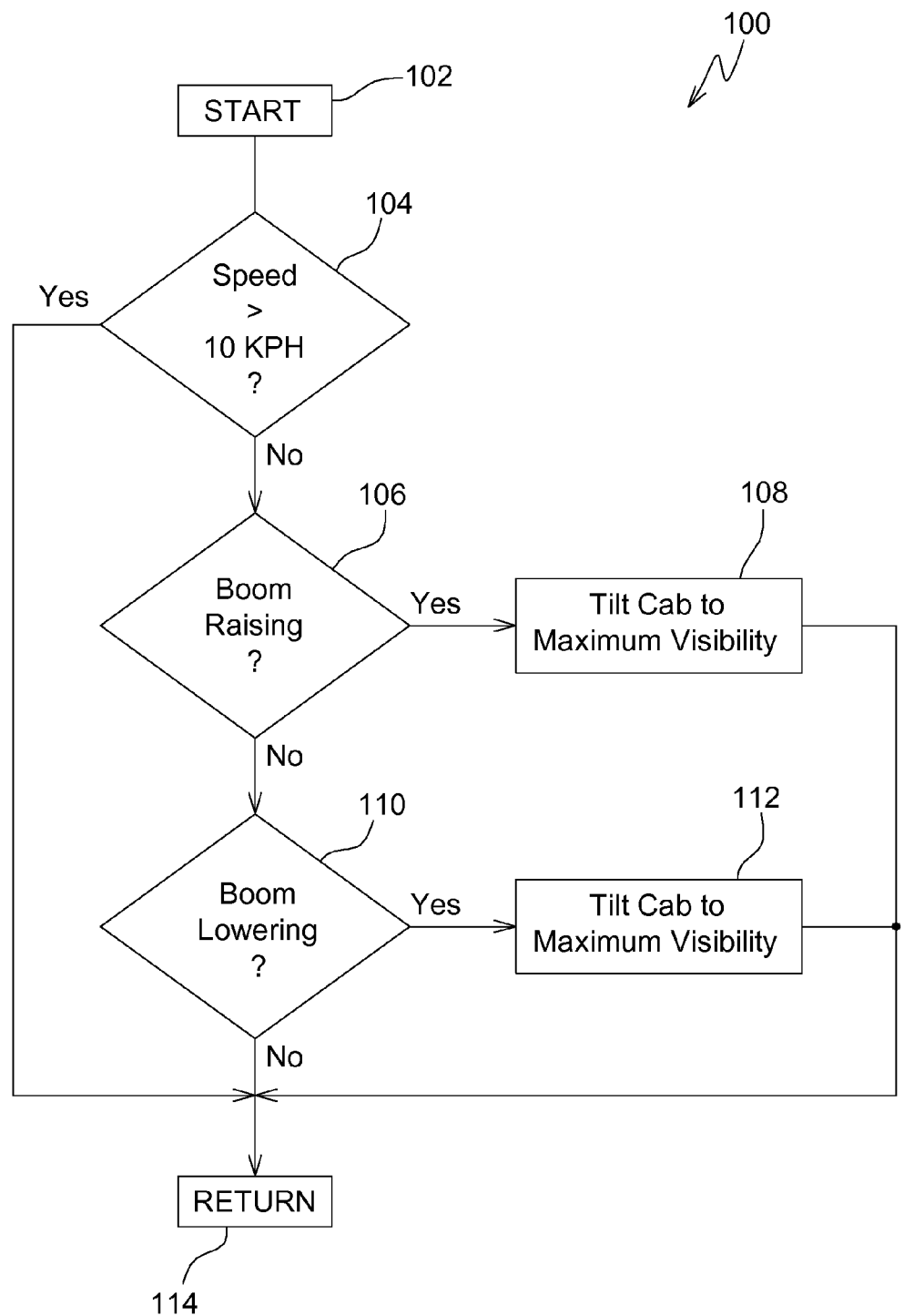
FIG. 2 is a logic flow diagram of an algorithm performed by the system of FIG. 1.

The ECU 50 executes an algorithm 100 represented by FIG. 2. The algorithm starts at step 102. If the speed of the vehicle 10 exceeds a speed threshold, such as for example, 10 kph, then step 104 directs the algorithm to step 114, else to step 106.

If the boom 42 is being raised by the operator, then step 106 directs the algorithm to step 108, else to step 110. Step 110 causes the cab 14 to be tilted to maximize visibility of the boom from the cab 14, then directs the algorithm to step 114.

If the boom 42 is being lowered by the operator, then step 110 directs the algorithm to step 112, else to step 114. Step 112 causes the cab 14 to be tilted to maximize visibility of the boom from the cab 14, then directs the algorithm to step 114. The algorithm 100 ends at step 114.

The conversion of the above flow chart into a standard language for implementing the algorithm described by the flow chart in a digital computer or microprocessor, will be evident to one with ordinary skill in the art.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work vehicle comprising:
a front axle;
a rear axle;
a chassis;
a cab pivotally coupled to the chassis;

a loader including a boom, the boom movably mounted on the chassis and the loader further including a boom cylinder for raising and lowering the boom;

a rear suspension member for raising and lowering the cab with respect to the rear axle;

a front suspension member for raising and lowering the chassis and the cab with respect to the front axle;

an operator controlled command unit; and an electronic control unit (ECU) connected to the front suspension member, the rear suspension member and the command unit, the ECU automatically operating the front suspension member to raise and lower the cab to improve visibility of the loader from the cab in response to the command unit operating the boom.

2. The work vehicle of claim 1, wherein:

a vehicle speed sensor provides a vehicle speed signal to the ECU; and the ECU prevents automatically raising and lowering of the cab if vehicle speed is greater than a speed threshold.

3. The work vehicle of claim 1, wherein:

a vehicle speed sensor provides a vehicle speed signal to the ECU; and the ECU prevents automatic operation of the rear suspension member if a speed of the vehicle exceeds a speed threshold.

4. A work vehicle comprising:

a chassis including a front axle and a rear axle;

a cab pivotally coupled to the chassis;

a boom movably mounted on the chassis;

a boom cylinder for raising and lowering the boom;

a suspension member for raising and lowering one end of the cab;

an operator controlled command unit manipulated by an operator to operate the boom;

a vehicle speed sensor provides a vehicle speed signal; and an electronic control unit (ECU) connected to the suspension member, the vehicle speed sensor, and the command unit, the ECU automatically operating the suspension member to raise and lower the cab to improve visibility of the loader from the cab in response to the command unit operating the boom;

wherein, in response to the vehicle speed signal, the ECU prevents automatic operation of the suspension member if a speed of the vehicle exceeds a speed threshold.

5. The work vehicle of claim 4, wherein:

in response to the vehicle speed signal, the ECU enables automatic operation of the suspension member if a speed of the vehicle is less than said speed threshold.

6. A cab tilt control system for a work vehicle having a chassis supported on a front axle and a rear axle, a cab pivotally coupled to the chassis, a loader including a boom movably mounted on the chassis and including a boom cylinder for raising and lowering the boom, a suspension member for raising and lowering one end of the cab, a speed sensor providing a speed signal, and an operator controlled command unit manipulated by an operator to operate the boom, the control system comprising:

an electronic control unit (ECU) connected to the speed sensor to receive the speed signal, to the suspension member and to the command unit, the ECU automatically operating the suspension member to raise and lower the cab to improve visibility of the loader from the cab in response to the command unit operating the boom.

7. The cab tilt control system claim 6, wherein:

in response to the speed signal, the ECU prevents automatic operation of the suspension member if a speed of the vehicle exceeds a speed threshold.

\* \* \* \* \*